United States Patent Office 2,944,093
Patented July 5, 1960

2,944,093

SEPARATION OF HYDROCARBON MIXTURES CONTAINING RELATIVELY STRAIGHT-CHAIN COMPONENTS

Ralph B. Thompson, Hinsdale, Ill., assignor, by mesne assignments, to Universal Oil Products Company, Des Plaines, Ill., a corporation of Delaware No Drawing. Filed May 26, 1958, Ser. No. 737,529

9 Claims. (Cl. 260—676)

This invention relates to a separation process for removing or recovering an aliphatic hydrocarbon having a relatively straight chain configuration (relative, that is, to the other components of the mixture) by selective sorption of such component in or on a solid sorbent of the class characterized as a "molecular sieve," the remaining components of the hydrocarbon mixture being one or more of the group comprising more highly branched chain hydrocarbons than the selectively sorbed component, aromatic hydrocarbons and/or naphthenes.

More specifically, this invention concerns a method of segregating a hydrocarbon containing at least four carbon atoms per molecule and containing a straight-chain of carbon atoms having at least three carbon atoms from either end of the hydrocarbon molecule from a mixture of the same with a more highly branched-chain aliphatic or cyclic hydrocarbon utilizing as a separating agent, a sorbent capable of combining selectively with said relatively straight chain aliphatic component, being the condensation product of an aromatic aldehyde containing a nuclear hydroxyl group with a polyhydric phenol containing at least two nuclear hydroxyl groups.

One object of this invention is to separate a hydrocarbon mixture containing various structural classes of hydrocarbons, including a relatively straight-chain aliphatic hydrocarbon into a sorbate fraction comprising said relatively straight-chain component from a raffinate fraction which may comprise more highly branched-chain aliphatic hydrocarbons and/or cyclic hydrocarbons present in the mixture.

Another object of the invention is to appreciate the octane number of a mixture of hydrocarbons, incident to the separation from the mixture of the components having a relatively low octane number.

In one of its embodiments the present invention relates to a process for separating a relatively straight-chain aliphatic hydrocarbon containing at least four carbon atoms per molecule from a raffinate-type hydrocarbon selected from the branched-chain aliphatic and cyclic hydrocarbons which comprises contacting a mixture of said relatively straight-chain and said raffinate-type hydrocarbons with a sorbent for the former of the aforementioned classes of hydrocarbons comprising the condensation product of a polyhydric phenol containing at least two and not more than three hydroxyl groups containing at least two nuclearly substitutible hydrogen atoms with a nuclearly-substituted benzaldehyde in which at least one nuclear substituent is selected from the group consisting of hydroxyl and alkoxyl, and withdrawing said raffinate-type hydrocarbon from said sorbent.

A more specific embodiment of this invention relates to a method for separating normal paraffins from isoparaffins, each containing at least four carbon atoms per molecule, which comprises distilling a mixture of said normal and isoparaffins in the presence of a solid sorbent comprising the condensation product of salicylaldehyde and resorcinol, and withdrawing an overhead distillate enriched with respect to said isoparaffinic hydrocarbon.

In general, the present process provides a means of separating hydrocarbon mixtures comprising components which differ in structure, that is, components which differ in arrangement of carbon atoms in the molecular chain. More specifically, the process is directed to a method for separating hydrocarbon mixtures made up of components having a relatively straight-chain molecular structure from other components in the mixture having a more highly branched-chain structure or components which are cyclic, of either naphthenic or aromatic character.

The effectiveness of the present process for separating hydrocarbon mixtures depends upon the ability of a special class of separating agents, herein referred to as solid sorbents, to combine with or otherwise selectively retain the relatively straight-chain aliphatic component of the hydrocarbon mixture contacted therewith in preference to the cyclic or branched-chain components, if present, in the original hydrocarbon mixture. Thus, the solid sorbent is capable of selectively combining with the relatively straight-chain aliphatic components and is equally selective in rejecting the raffinate-type components selected from the branched-chain aliphatic and cyclic hydrocarbons. The process and mechanism by which such separation occurs is herein referred to as a "sorption" process, although it is believed that the mechanism through which the separation occurs is one of selective retention of the straight-chain components or at least the straight-chain portion of the hydrocarbon molecule having at least 4 carbon atoms within an enclosure formed by the molecular structure of the solid sorbent. This selective retention of the sorbed components of the hydrocarbon mixture is thus characteristically a molecular sieve-type action in which the sorbed component is retained by the sorbent while the raffinate-type component (i.e. the branched-chain aliphatic and cyclic hydrocarbons of the feed stock mixture) are restrained from entering into the porous structure of the sorbent molecule.

The molecular sieve sorbents utilized as separating agent in the present process are the products formed by the condensation between a polyhydric phenol and a nuclearly-substituted benzaldehyde derivative having the following molecular configuration:

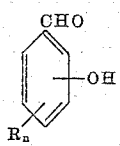

wherein R is a nuclear substituent selected from the group consisting of hydroxyl and alkoxy containing an alkyl group having from one to five carbon atoms and $n$ is a number having a value from 0 to 1. At least one of the nuclear substituents is an hydroxyl radical which activates the formyl group into a radical condensible with the dihydric phenol derivative to form the present molecular sieve separating agent. Typical specific aldehydes having the above structure which will react in a condensation reaction with a polyhydric phenol to form the present solid sorbent include such compounds as para-hydroxybenzaldehyde, meta-hydroxybenzaldehyde, salicylaldehyde, protocatechuic aldehyde, vanillin, piperonal, etc.

Dihydric phenol compounds condensible with the above hydroxybenzaldehydes to form the present solid sorbent have the following structure:

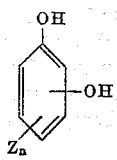

wherein Z is selected from the group consisting of hydroxyl, alkoxy and alkyl, in which the alkyl proportion of the radical contains from 1 to 5 carbon atoms, and certain non-interfering alternative radicals such as nitro, cyano, etc. The numeral $n$, designating the number of such substituents which may be present on the nucleus of the dihydric phenol, may have a value of from 0 to 1, thus providing nuclearly replaceable hydrogen atoms on the aromatic ring which may undergo condensation with the aldehyde to form the present solid sorbent. Typical specific dihydric phenols containing at least two but not more than three nuclear hydroxyl groups include such compounds as resorcinol, pyrocatechol, hydroquinone, pyrogallol, phloroglucinol, 1,2,4-trihydroxybenzene, 2-methylresorcinol, 2 - ethylresorcinol, 3,5 - dimethylhydroquinone, 4-methoxyresorcinol, 4-propoxyresorcinol, etc.

The condensation of the dihydric phenol or a derivative thereof in accordance with the process of the present invention, with a nuclearly-substituted benzaldehyde compound, is effected at a relatively elevated temperature and in the presence of an acidic condensation catalyst, such as sulfuric acid, phosphoric acid, hydrofluoric acid, hydrochloric acid, or other acid-acting condensation catalyst, generally selected from the inorganic acids, the reactants being maintained in liquid phase during the formation of the solid condensation product which separates from the mixture as a solid of relatively high melting point having relatively little solubility in common organic solvents. The condensation product is believed to have a structure corresponding to that formed by condensation of the formyl group of the benzaldehyde derivative with a pair of active hydrogen atoms from the dihydric phenol in which a ring type enclosure having a molecular dimension sufficient to accommodate within the ring structure the portion of the molecule in the structure of the components to be separated from the feed stock having at least three unbranched carbon atoms at the end of an aliphatic chain. Thus, the ring formed by virtue of the condensation reaction between the benzaldehyde derivative and the dihydric phenol derivative has a sufficient molecular dimension to accommodate within the ring structure the "tail" end of an aliphatic hydrocarbon molecule containing at least three carbon atoms in an unbranched-chain, while excluding aliphatic hydrocarbons from its internal structure which have methyl or longer chain radicals attached to the aliphatic molecule in branched-chain relationship to the central skeleton of aliphatic and cyclic hydrocarbons, both of the latter classes of which have molecular diameters which will not permit the molecules to fit into the ring enclosure of the condensation product. In effect, therefore, the separating agent herein is believed to act in the capacity of a molecular sieve capable of physically retaining the relatively straight-chain components of the hydrocarbon mixture comprising the feed stock or of depressing the volatility of such relatively straight-chain components to permit separation of the non-sorbed components of the feed stock as an overhead distillate or as a raffinate stream.

Suitable hydrocarbon feed stock mixtures utilizable in the present separation process include hydrocarbon mixtures containing from small to large amounts of normal or relatively straight-chain aliphatic hydrocarbons, the remaining component or components of the feed mixture being any one or more members of the group comprising aliphatic hydrocarbons of more highly branched-chain structure than the components to be separated, naphthenic hydrocarbons and aromatic hydrocarbons of mono- or bicyclic ring structure, the separation effect being, in general, limited to mixtures in which the separable component or the component to be segregated from the mixture contains at least four carbon atoms per molecule. Thus, the mixture may contain such hydrocarbons as propane and propylene, ethane and methane, but these will not be retained by the solid sorbent, probably because the molecular diameters of these hydrocarbons are not sufficient to be retained within the ring portion of the condensation product constituting the present separating agent. A branched-chain or cyclic hydrocarbon, however, having an unbranched-chain aliphatic portion containing at least three carbon atoms at one end of the molecule may be retained by the present separating agent as a sorbate component. Thus, such compounds as 2,2-dimethylhexane, 2,3-dimethylhexane, 2-methylpentane, 3-methylnonane, n-amylbenzene, 2-methyl-4-octyl-cyclohexane, etc. contain an unbranched-chain at "one end" of the molecule having three carbon atoms in the unbranched portion and, accordingly, will tend to be sorbed by the separating agent in preference to a more highly branched-chain hydrocarbon such as 2,3-dimethylbutane, etc.

A particularly useful application of the present separation process is for the treatment of gasoline boiling range fractions for the purpose of increasing the octane number thereof by removal of the relatively straight-chain aliphatic hydrocarbon components therefrom having the lowest octane rating of the various types of hydrocarbons and which, if retained in the gasoline mixture, reduce the octane rating of the entire fraction in which they occur. Thus, by subjecting a mixture of hydrocarbons boiling in the gasoline range to treatment with the present separating agent, the effluent or raffinate from the process contains a relatively greater proportion of hydrocarbon types of higher octane rating than the feed stock mixture because of the selective removal of the normal or relatively straight-chain aliphatic components from the feed stock. The resulting sorbate or component of the hydrocarbon mixture retained by the sorbent may be individually recovered and further subjected to the same or a different type of hydrocarbon conversion process, such as an isomerization or reforming reaction to thereby convert the recovered, relatively straight-chain hydrocarbons into more highly branched-chain or cyclic isomers of higher octane rating. In specifying a hydrocarbon of relatively straight-chain configuration herein, it is intended that such designation include aliphatic hydrocarbons having at one end of the molecule an unbranched-chain of at least four carbon atoms, being the portion of the molecule retained by the solid sorbent.

The process is generally limited to hydrocarbons having sufficient fluidity at the temperature and pressure at which the feed stock is charged into the separation process to flow readily, without undue pressure drop, through a bed of the sorbent particles and which have boiling points sufficiently below the temperature at which the hydrocarbons undergo thermal decomposition to permit the relatively branched-chain or cyclic raffinate-type hydrocarbons to be distilled from the sorbent which retains the relatively straight-chain components. In general, the feed stock is preferably limited to hydrocarbon mixture in which the components contain not more than about 20 carbon atoms per molecule.

In the application of the present process to a separation problem for recovering or removing normal or relatively straight-chain aliphatic components from a mixture of hydrocarbons, the feed stock mixture may be passed through a bed of or mixed with particles of the present solid sorbent, or the sorbent may be added to a distillation column in which the feed stock is fractionated in an extractive distillation type of operation. A convenient method of operating a contacting type of separation process involving the present solid sorbent comprises mixing the hydrocarbon feed stock in liquid phase with the sorbent in finely powdered form (the sorbent normally existing in the form of solid having a relatively high melting point), thereafter thoroughly mixing the liquid feed stock with the solid sorbent and recovering from the resulting slurry the solid portion thereof comprising the sorbent having adsorbed or occluded thereon the normal or relatively straight-chain aliphatic hydrocarbon component of the feed stock, for example, by filtration, centrifugation, etc. and separately recovering the non-sorbed hydrocarbon portion comprising the raffinate-type hydrocarbon components. In view of the relative insolubility of the present solid sorbent in the hydrocarbon feed stock, another method of operating the separation process involving the present sorbent comprises passing the hydrocarbon feed stock mixture in liquid or vapor form through a vertical column packed with finely divided particles of the solid sorbent until the latter has substantially saturated its capacity to sorb additional sorbate. In this type of operation, the solid sorbent may be composited or deposited on a suitable solid supporting material, such as charcoal, sand, quartz chips, fire brick or other solid material of generally porous structure and insoluble in the hydrocarbon feed stock. If the temperature of the operation is such that a normally liquid feed stock mixture is vaporized at the ambient pressure, the temperature is limited only by the melting point of the solid sorbent, being sufficiently below the latter temperature to maintain the solid sorbent in substantially solid form.

One of the preferred methods of separation utilizing the present solid sorbent comprises mixing the sorbent with the hydrocarbon feed stock and subjecting the resulting mixture to extractive distillation under conditions whereby the branched-chain and/or cyclic components of the feed stock (the so-called "raffinate" components), the boiling points of which are unaffected by the presence of the solid sorbent, are distilled overhead, while the normal or relatively straight-chain aliphatic components of the feed stock, the vapor pressures of which are depressed by combining with the sorbent, are retained within the distillation column as a higher boiling residue. Still another method of separation which comprises an effective means of separating the components of the mixed hydrocarbon feed stock comprises mixing the feed stock with an aqueous slurry of the sorbent in finely divided form, thereafter allowing phase separation to take place and filtering or decanting the aqueous layer from the hydrocarbon phase. The sorbate normal or relatively straight-chain components combine with the solid sorbent, while the branched-chain or cyclic hydrocarbon components form a separate phase which may be decanted, steam distilled, centrifuged or filtered from the solid phase comprising the sorbed straight-chain components. Instead of water as the suspending medium, a hydrocarbon conveniently having a boiling point above or below the feed stock mixture may be utilized as the suspending medium, the raffinate component of the feed stock thereby mixing with the excess hydrocarbon suspending medium which may be distilled or otherwise separated from the raffinate components of the feed stock. The preferred hydrocarbons for this purpose are the cyclic and branched-chain hydrocarbons of molecular weight lower than that of the hydrocarbon components of the feed stock, such as isopentane, isobutane, cyclopentane, cyclohexane, or other low molecular weight hydrocarbons of the class not sorbed by the present separating agent.

If desired, the sorbate component sorbed by the separating agent may be recovered from the sorbent and for this purpose the solid complex or adduct formed during the contacting procedure may be heated above the boiling point of the sorbed hydrocarbon to distill the same from the complex or adduct, preferably under reduced pressure in order to increase the rate and totality of recovery. Another suitable method for recovering the sorbed hydrocarbon comprises washing the complex with an excess of a liquid or gaseous hydrocarbon comprising a class of hydrocarbon which acts as a desorbing agent, such as a hydrocarbon of lower molecular weight which is preferentially sorbed by the solid sorbent and which may be subsequently separated from the resulting effluent mixture, such as n-butane, n-pentane, n-hexane, etc., depending upon the boiling point of the initial feed stock mixture.

The washing or desorption step is preferably effected under countercurrent flow conditions in order to take advantage of the mass action effect. The recovered solid sorbent after contact with the desorbing agent may generally be readily regenerated by heating, steaming, or by other means well-known in the art for restoring the adsorbency of the sorbent for further use in a succeeding run.

The separating process herein provided is effected at a temperature below the melting point of the sorbent which is generally above about 300° C. In order to maintain the feed stock in substantially liquid phase, the separation is preferably effected at a temperature below about 150° C. and at a pressure sufficient to maintain the feed stock in substantially liquid phase, comprising the preferred type of operation. The ratio of sorbent to feed stock maintained in the separation zone depends upon the concentration of the relatively straight-chain component in the feed stock and in general, is sufficient to provide a ratio of sorbent to sorbate of from 1:1 to about 20:1 weight proportions, or even higher, up to about 100:1 in the event that a relatively pure product stream of raffinate is desired. This proportion may be reduced, however, in the event that a countercurrent contacting procedure is employed in the separation process.

As previously indicated, the present separation process may be effected in a typical batch-type procedure or on a continuous basis and in a typical batch-type operation the sorbent and feed stock mixture are charged into a suitable vessel wherein the resulting mixture may be stirred or otherwise agitated for a period of from about ½ to about 2 hours, followed by separating the sorbent-sorbed hydrocarbon complex, for example, by centrifugal means, filtration, or by other suitable methods of separation. In a typical continuous type of operation the feed stock mixture and sorbent are continuously charged into an elongated column, for example, into the top end of a vertical vessel (the end from which the raffinate stream of non-sorbed feed stock hydrocarbon components are withdrawn) at the same time that spent sorbent is withdrawn from the other end of the vessel into which the feed stock is generally charged. In a preferred embodiment, the feed stock mixture is charged into the central portion of a vertical column, into the bottom of which a desorbent stream of the aforementioned composition is charged continuously. A raffinate stream is removed from the upper end of the column and the spent sorbent containing sorbate is withdrawn into a second, recovery column into the bottom of which a desorbent stream is charged and from the top of which a product stream comprising desorbent and sorbate is removed, while regenerated sorbent is removed from the bottom.

In a continuous type of operation as described above, the desorbent, preferably at a sufficiently elevated temperature to vaporize the sorbed hydrocarbon from the complex, is charged into a stripping column, preferably under countercurrent flow relationship to the spent sorbent charged into the opposite end of the column to thereby recover the sorbate component of the feed stock. Depending upon the temperature of desorption, the sorbed hydrocarbon is recovered from the desorbent in vapor or liquid state from the effluent end of the desorption column.

The present invention is further described with respect to several embodiments thereof in the following examples which, however, are not intended to limit the scope of the invention necessarily in accordance therewith.

*Example I*

A synthetic mixture of normal heptane and iso-octane containing 50% by weight of each was utilized as the feed stock in a separation process in which the hydrocarbon mixture was contacted in a packed column of solid sorbent particles formed by condensing salicylaldehyde with resorcinol. The latter solid adsorbent is prepared by reacting 14.5 grams of salicylaldehyde with 13.5 grams of resorcinol charged into a stirred reaction vessel containing 60 cc. of distilled water, 60 cc. of ethyl alcohol and 13.1 grams of concentrated sulfuric acid. This mixture was gradually heated over a period of 3¼ hours from a temperature of 28° C. to 70° C. as the mixture was stirred. A solid product formed during the course of the reaction, being recovered from the aqueous solution by filtration. The filter was washed with 25 cc. aliquots of warm water, followed by washing the product with warm ethyl alcohol. The recovered solid was dried at 75° C. for six hours and weighed. A substantially quantitative yield of product was recovered. The solid was insoluble in substantially all common solvents and had a melting point above about 300° C.

The above solid condensation product of salicylaldehyde and resorcinol crushed into particles of about 40 mesh size was used as a packing material in a sorption column comprising a tube of 10 inches in length by 7 mm. I.D. having an inlet at the top of the tube and a liquid outlet at the bottom of the tube. Packing the tube in this manner with the powdered sorbent provided a sorption column approximately 8 inches in length.

The synthetic mixture of normal heptane and iso-octane was introduced dropwise into the top of the column and allowed to percolate downwardly through the sorbent packing material and the effluent draining from the bottom of the tube collected in fractions equal to 10% by volume of the total volume of feed stock charged into the top of the column. The column and the feed stock charged into the top of the packing were maintained at approximately room temperature. The first fractions were recovered in 10 cc. quantities, each representing 10% by volume of the total charge into the column and were analyzed by vapor phase chromatography to determine the proportion of normal heptane and iso-octane in the effluent cuts. The first 10% fraction contained 55.8% iso-octane and 44.2% normal heptane by volume. A second fraction representing 10% by volume of total charge stock was separately collected from the effluent outlet and on analysis contained 52% iso-octane and 48% normal heptane.

*Example II*

In the following run an extractive distillation type procedure utilizing the solid sorbent of Example I, above (that is, the condensation product of resorcinol with salicylaldehyde) is utilized and a similar enrichment of the iso-octane in the overhead distillate fractions is observed. Into a distillation flask of 500 cc. capacity is charged 100 cc. of a mixture of iso-octane and normal heptane containing 50% by weight of each component, together with 40 grams of the salicylaldehyde-resorcinol condensation product. Distillation of the resulting mixture and collection of the overhead distillate in 10 cc. cuts demonstrates that the overhead distillate is enriched in the iso-octane component. The first 10 cc. fraction contains 61.2% iso-octane and 38.8% normal heptane. The second 10% fraction contains 52% iso-octane and 48% normal heptane. A similar distillation of the synthetic mixture of iso-octane and normal heptane in the absence of a salicylaldehyde-resorcinol sorbent and a collection of the distillate in 10 cc. cuts yields distillate fractions each containing 50 weight percent of normal heptane and iso-octane with no enrichment in either component.

*Example III*

Utilizing the chromatographic adsorption procedure and apparatus of Example I a synthetic mixture of 50% normal hexane and 50% by weight of cyclohexane is charged into the adsorption column containing a solid sorbent packing material comprising particles of about 40 mesh size of the condensation product of 3-hydroxy, 4-methylbenzaldehyde and phloroglycinol, the product of the condensation reaction being an amorphous solid having a melting point in excess of about 300° C., insoluble in alcohols, hydrocarbons, ethers, etc. The effluent fractions of liquid hydrocarbon collected in 10 cc. aliquots are analyzed by vapor phase chromatography to determine the proportion of normal hexane and cyclohexane in the effluent cuts. The first 10 cc. fraction collected from the bottom of the sorption column contains 58.3% cyclohexane and 41.7% normal hexane. The second 10 cc. aliquot collected from the bottom of the sorption column contains 54.1% cyclohexane and 45.9% normal hexane.

In a similar run utilizing as feed stock a mixture of 50 weight percent normal hexane and 50% by weight of benzene, a comparable separation is realized.

*Example IV*

A limited degree of separation, but nevertheless a definite indication of selectivity, was obtained in a chromatographic type procedure between 3-methylpentane and 2,3-dimethylbutane, thereby establishing a preference (albeit less pronounced than for aliphatic normal hydrocarbons) for the relatively straight-chain hydrocarbons containing an unbranched-chain at one end of the molecule having at least 3 carbon atoms in the unbranched-chain. A 50–50% mixture of the above hexanes introduced dropwise into a column of the sorbent utilized in Example I, above, containing about 8 inches of solid sorbent yields an effluent raffinate (collected in 10% aliquots) enriched in 3-methylpentane, the first aliquot containing 53% 3-methylpentane and 47% 2,3-dimethylbutane. The second aliquot was also enriched in the 3-methylpentane containing 52.5% of 3-methylpentane and 47.5% of 2,3-dimethylbutane.

I claim as my invention:

1. A process for separating a relatively straight-chain sorbate hydrocarbon containing at least 4 carbon atoms per molecule from a raffinate-type hydrocarbon selected from the branched-chain aliphatic and cyclic hydrocarbons which comprises contacting a mixture of said sorbate and said raffinate-type hydrocarbons with a sorbent comprising the condensation product of a phenol containing at least two and not more than three nuclear hydroxyl groups and not more than one additional nuclear substituent selected from the group consisting of hydroxyl, alkoxyl and alkyl with a nuclearly-substituted benzaldehyde having not more than 2 nuclear substituents other than the formyl radical, one of said substituents being hydroxyl and the other being selected from the group consisting of hydroxyl, alkoxyl and alkyl, and withdrawing said raffinate-type hydrocarbon from a resulting spent sorbent.

2. The process of claim 1 further characterized in that said sorbate hydrocarbon contains a straight-chain alkyl group at one end of the molecule, the alkyl group containing at least three carbon atoms.

3. The process of claim 1 further characterized in that said sorbate hydrocarbon is a normal paraffin containing not more than 20 carbon atoms per molecule.

4. The process of claim 3 further characterized in that said sorbate is n-hexane and said raffinate is selected from the group consisting of isohexanes, cyclohexane and benzene.

5. The process of claim 3 further characterized in that said raffinate hydrocarbon is a naphthene.

6. The process of claim 3 further characterized in that said raffinate-type hydrocarbon is a branched-chain aliphatic paraffin.

7. The process of claim 1 further characterized in that said sorbate hydrocarbon is recovered from said spent sorbent by contacting the spent sorbent with a paraffinic hydrocarbon having a boiling point different from the boiling point of said sorbate at a temperature above the sorption temperature and thereafter distilling the separately recovered mixture of desorbent and sorbate.

8. The process of claim 1 further characterized in that said hydrocarbon mixture is distilled in the presence of said condensation product and said raffinate-type hydrocarbon is recovered by separating the overhead distillate.

9. The process of claim 1 further characterized in that said sorbent is the condensation product of resorcinol with salicylaldehyde.

References Cited in the file of this patent

UNITED STATES PATENTS

| | | |
|---|---|---|
| 2,504,100 | Plank et al. | Apr. 18, 1950 |
| 2,671,059 | Smit | Mar. 2, 1954 |
| 2,698,870 | Bloch et al. | Jan. 4, 1955 |
| 2,818,450 | Thompson et al. | Dec. 31, 1957 |